US009928999B2

(12) United States Patent
Green et al.

(10) Patent No.: US 9,928,999 B2
(45) Date of Patent: Mar. 27, 2018

(54) FLAGGING ADC COALESCENCE

(71) Applicant: Micromass UK Limited, Wilmslow (GB)

(72) Inventors: Martin Raymond Green, Bowden (GB); Keith Richardson, High Peak (GB); Jason Lee Wildgoose, Stockport (GB)

(73) Assignee: Micromass UK Limited, Wilmslow (GB)

( * ) Notice: Subject to any disclaimer, the term of this patent is extended or adjusted under 35 U.S.C. 154(b) by 0 days.

(21) Appl. No.: 15/317,049

(22) PCT Filed: Jun. 11, 2015

(86) PCT No.: PCT/GB2015/000174

§ 371 (c)(1),
(2) Date: Dec. 7, 2016

(87) PCT Pub. No.: WO2015/189546

PCT Pub. Date: Dec. 17, 2015

(65) Prior Publication Data

US 2017/0098531 A1 Apr. 6, 2017

(30) Foreign Application Priority Data

Jun. 11, 2014 (EP) .................................... 14171963
Jun. 11, 2014 (GB) .................................. 1410382.4

(51) Int. Cl.
*H01J 49/38* (2006.01)
*G06F 19/18* (2011.01)
(Continued)

(52) U.S. Cl.
CPC ................................ *H01J 49/0036* (2013.01)

(58) Field of Classification Search
CPC .... H01J 49/0036; H01J 49/004; H01J 49/027; H01J 49/38; H01J 49/0031; H01J 49/0045; H01J 49/025; H01J 49/06; H01J 49/40; G06F 19/70; G06F 19/18; G06F 19/703; G01N 30/72; G01N 30/8675;
(Continued)

(56) References Cited

U.S. PATENT DOCUMENTS 6,653,076 B1 * 11/2003 Franza, Jr. ............... C12Q 1/02 424/9.1
6,734,420 B2 * 5/2004 Empedocles ......... B01L 3/5025 250/271
(Continued)

FOREIGN PATENT DOCUMENTS

WO 98/21742 5/1998
WO 2004/111609 12/2004

*Primary Examiner* — David A Vanore
(74) *Attorney, Agent, or Firm* — Womble Bond Dickinson (US) LLP; Deborah M. Vernon; Heath T. Misley

(57) ABSTRACT

A method of mass spectrometry is disclosed comprising digitising at least one individual signal or transient, determining in relation to the digitized signal or transient an indication of overlap and/or coalescence of ion arrivals in the digitized signal or transient, or one or more ion arrival envelopes in the digitized signal or transient, and marking or flagging the digitized signal or transient as suffering from overlap or coalescence of ion arrivals based on the indication.

22 Claims, 2 Drawing Sheets

(51) Int. Cl.
*G01N 30/72* (2006.01)
*H01J 49/00* (2006.01)

(58) Field of Classification Search
CPC ......... G01N 33/5005; G01N 33/54373; G01N 33/58; G01N 21/25; G01N 21/253; G01N 21/272; G01N 21/274; G01N 21/278; G01N 21/6428; G01N 21/6452; G01N 21/6456; G01N 21/6486; G01N 21/6489
USPC .... 250/282, 287, 271, 281, 283, 290, 458.1, 250/459.1; 702/23, 27, 28, 22, 30, 32
See application file for complete search history.

(56) References Cited

U.S. PATENT DOCUMENTS

| | | | | |
|---|---|---|---|---|
| 6,870,156 | B2 | 3/2005 | Rather | |
| 6,944,549 | B2 | 9/2005 | McClure | |
| 7,105,806 | B2 | 9/2006 | Pappin et al. | |
| 7,804,062 | B2 * | 9/2010 | Meija .................. | H01J 49/0036 250/282 |
| 8,063,358 | B2 | 11/2011 | Bateman et al. | |
| 8,354,634 | B2 | 1/2013 | Green et al. | |
| 8,598,513 | B2 | 12/2013 | Gilbert et al. | |
| 8,735,808 | B2 * | 5/2014 | Denny ................ | H01J 49/0036 250/282 |
| 8,809,767 | B2 | 8/2014 | Bateman et al. | |
| 8,941,056 | B2 | 1/2015 | Green et al. | |
| 9,043,164 | B2 | 5/2015 | Makarov | |
| 9,324,545 | B2 | 4/2016 | Green et al. | |
| 9,520,277 | B2 * | 12/2016 | Yamada .............. | H01J 49/0036 |
| 2005/0114042 | A1 * | 5/2005 | Pappin ................ | H01J 49/0036 702/30 |
| 2009/0176199 | A1 * | 7/2009 | Lee ....................... | C07B 59/008 435/4 |
| 2012/0109537 | A1 * | 5/2012 | Makarov ............. | H01J 49/0036 702/27 |
| 2013/0268212 | A1 * | 10/2013 | Makarov ............... | H01J 49/025 702/32 |
| 2013/0286380 | A1 * | 10/2013 | Selker ....................... | G01J 3/44 356/51 |
| 2014/0346345 | A1 * | 11/2014 | Makarov ............. | H01J 49/0031 250/283 |
| 2015/0340216 | A1 * | 11/2015 | Kwiecien ........... | G06K 9/00543 250/282 |

* cited by examiner

FLAGGING ADC COALESCENCE

CROSS-REFERENCE TO RELATED APPLICATIONS

This application represents the U.S. National Phase of International Application number PCT/GB2015000174 entitled "Flagging ADC Coalescence" filed 11 Jun. 2015, which claims priority from and the benefit of United Kingdom patent application No. 1410382.4 filed on 11 Jun. 2014 and European patent application No. 14171963.3 filed on 11 Jun. 2014. The entire contents of these applications are incorporated herein by reference.

FIELD OF THE PRESENT INVENTION

The present invention relates generally to mass spectrometry and in particular to methods of mass spectrometry and mass spectrometers. Embodiments may relate to digitising a plurality of individual signals or transients using an Analogue to Digital Converter ("ADC") and summing the time and intensity values relating to the digitised signals or transients to generate a composite mass spectrum.

BACKGROUND

It is known to record or digitise individual signals or transients arising from ion arrivals at an ion detector or electron multiplier using an Analogue to Digital recorder or an Analogue to Digital Converter ("ADC"). Orthogonal acceleration Time of Flight mass spectrometers may digitise ion arrival signals or transients relating to many thousands of individual time of flight separations. The digitised signals or transients are summed to produce a final summed or composite time of flight mass spectrum. Each individual time of flight spectrum, signal or transient may be processed in real time before summing. In the simplest case this processing may be the application of an amplitude threshold to isolate signals arising from ion arrivals from background noise or baseline noise. The signal at an individual digitised sample (i.e. an individual Analogue to Digital Converter time bins) or within a time of flight spectrum which is above the threshold is recorded and all other samples or intensity values in Analogue to Digital Converter time bins are set to zero or to a baseline value. Such a method is disclosed, for example, in US 2011/0049353 (Micromass). Multiple time of flight spectra processed in this way may then be summed or averaged to generate a final summed spectrum with reduced noise.

It is also known to process individual signals or transients which have been digitised to reduce the ion arrival signals or transients into time and intensity pairs. Such a method is disclosed, for example, in U.S. Pat. No. 8,063,358 (Micromass). Individual signals or transients which are reduced to time and intensity pairs may then be summed with other time and intensity pairs relating to other time of flight spectra, signals or transients in order to produce a final summed, composite or average spectrum. This method substantially removes the profile or line width of the digitised signal from the final summed spectra thereby increasing the effective time of flight resolution. It also simplifies implementation of dual Analogue to Digital Converter approaches to extending dynamic range, such as U.S. Pat. No. 8,354,634 (Micromass), and allows simple up-sampling of output spectral data rates.

Other methods of reducing the contribution of the single ion pulse width are described in U.S. Pat. No. 6,870,156 (Rather).

In methods which involve reducing individual transients to time and intensity pairs, each ion arrival has an associated analogue peak width. If two or more ions arrive simultaneously then these analogue peak widths may partially overlap making it impossible for a simple Finite Impulse Response filter, peak maxima or related peak detection method to isolate the arrival time and intensity of the individual ions. In such a case a response related to the average ion arrival time and summed area may be recorded rather than two individual ion arrival times and intensities.

This coalescing of two or more ion arrivals within a transient into a single time intensity pair can cause artefacts in the final summed data. Furthermore, the analogue peak width from ions of different mass to charge ratio species may overlap significantly within a single transient. This will result in an inaccurate representation of the signal intensity and an inaccurate measurement of the ion arrival time for each mass to charge ratio species.

A method of de-convolving such overlapping signals is described in U.S. Pat. No. 8,735,808 (Micromass). However, this method can be computationally intensive.

GB-2457112 (Micromass) discloses methods and apparatus for detecting ions.

GB-2506714 (Micromass) discloses calibrating dual ADC acquisition systems.

GB-2439795 (Micromass) discloses obtaining mass spectra from a Time of Flight mass spectrometer.

WO 98/21742 (Rockwood) discloses a multi-anode time to digital converter.

EP-2447980 (Makarov) discloses a method of generating a mass spectrum having improved resolving power.

US 2005/0114042 (Pappin) discloses a method and apparatus for deconvoluting a convoluted spectrum.

US 2004/0083063 (McClure) discloses a method and apparatus for automated detection of peaks in spectroscopic data.

It is desired to provide an improved method of mass spectrometry and an improved mass spectrometer.

SUMMARY

According to an aspect there is provided a method of mass spectrometry comprising:

digitising at least one individual signal or transient;

determining in relation to the digitised signal or transient an indication of overlap and/or coalescence of ion arrivals in the digitised signal or transient, or one or more ion arrival envelopes in the digitised signal or transient; and marking or flagging the digitised signal or transient as suffering from overlap or coalescence of ion arrivals based on the indication.

This method gives an indication that an individual signal or transient suffers from overlap or coalescence by providing a mark or a flag in relation to this for the individual signal or transient. This provides a simple and effective way of recording the overlap or coalescence without having to analyse the signal or transient further. This is a development from, for example, the arrangement disclosed in U.S. Pat. No. 8,735,808 (Micromass) which involves utilising a complex de-convolution algorithm (as opposed to the simple flag or mark that is provided for each digitised signal or transient according to various embodiments). U.S. Pat. No. 8,735,808 (Micromass) does not disclose or suggest marking or flagging a digitised signal or transient as suffering from overlap or coalescence of ion arrivals.

GB-2457112 (Micromass) and GB-2506714 (Micromass) relate to the marking or flagging of saturated signals from an ADC wherein the signals are saturated due to the gain of the ADC. However, tt would not be possible to identify which individual signals or transients were suffering from overlap and/or coalescence of ion arrivals using the methods disclosed in GB-2457112 (Micromass) and GB-2506714 (Micromass).

Similarly, EP-2447980 (Makarov) does not provide an indication, i.e. a mark or flag, in relation to individual digitised transients that are suffering from overlap or coalescence of ion arrivals. The method disclosed in EP-2447980 (Makarov) reduces the intensity of an ion signal until the probability of peaks being from individual ions falls below a set value. This does not require individual digitised signals or transients being marked or flagged as is the case according to various embodiments.

The indication of overlap and/or coalescence of ion arrivals may comprise one or more geometrical features of the ion arrival envelope in the digitised signal or transient. The one or more geometrical features may be indicative of overlap and/or coalescence of ion arrivals, and may comprise at least one of profile, shape, symmetry, peak purity, peak area, intensity quantiles, standard deviation, centre of mass, peak width, skew and kurtosis.

The determining an indication of the proportion and/or severity of instances that the digitised signals or transients suffered from overlap and/or coalescence of ion arrivals may comprise comparing at least one of the geometrical features with an expected, known or calibrated value.

The method may further comprise processing said at least one digitised signal or transient to identify one or more peak profiles or ion arrival envelopes that are corrupted due to overlap or coalescence of ion arrivals.

The method may further comprise determining intensity and arrival time, mass or mass to charge ratio data for each of the one or more peak profiles or ion arrival envelopes that are corrupted due to overlap or coalescence of ion arrivals, such that optionally each of the one or more peak profiles or ion arrival envelopes are reduced to a single time and intensity pair, or one or more time and intensity pairs.

The step of marking or flagging the digitised signal or transient may comprise marking or flagging the time and intensity pair(s) as suffering from overlap or coalescence of ion arrivals.

The methods may further comprise de-convoluting each of the one or more corrupted peak profiles or ion arrival envelopes and determining two or more ion arrival times and two or more first ion arrival intensities associated with each of the one or more corrupted peak profiles or ion arrival envelopes.

The step of de-convoluting the digitised signal or transient may comprise either: (i) determining a point spread function characteristic of a single ion arriving at and being detected by an ion detector; or (ii) using a pre-determined point spread function characteristic of a single ion arriving at and being detected by an ion detector.

The method may further comprise processing the at least one digitised signal or transient to detect a first set of peaks, and determining intensity and arrival time, mass or mass to charge ratio data for each or at least some peaks in the first set of peaks, such that optionally each digitised signal or transient is reduced to a set of time and intensity pairs corresponding to the first set of peaks.

The marking or flagging the digitised signal or transient may comprise associating each mark or flag with a corresponding time and intensity pair.

The method may further comprise summing a plurality of the digitised signals or transients, or data relating to the digitised signals or transients, to generate a composite mass spectral data set.

The method may further comprise determining in relation to the composite mass spectral data set an indication of the proportion and/or severity of instances that the digitised signals or transients suffered from overlap and/or coalescence of ion arrivals.

The step of determining an indication of the proportion and/or severity of instances that the digitised signals or transients suffered from overlap and/or coalescence of ion arrivals may comprise counting the number of digitised signals or transients, peak profiles or ion arrival envelopes that have been marked or flagged as suffering from overlap or coalescence of ion arrivals.

The step of determining an indication of the proportion and/or severity of instances that the digitised signals or transients suffered from overlap and/or coalescence of ion arrivals may comprise determining a ratio A:B indicative of the proportion and/or severity of instances that the digitised signals or transients, peak profiles or ion arrival envelopes suffered from overlap and/or coalescence of ion arrivals, wherein "A" may be representative of the number of digitised signals or transients, peak profiles or ion arrival envelopes that have been marked or flagged as suffering from overlap or coalescence of ion arrivals, optionally within a given arrival time, mass to charge ratio or ion mobility region and "B" may be representative of the total number of digitised signals or transients that were summed, optionally within said given arrival time, mass to charge ratio or ion mobility region.

The method may further comprise altering one or more operating parameters of a mass spectrometer, optionally in response to determining one or more regions of the composite mass spectral data set that suffer from overlap or coalescence of ion arrivals.

The step of altering one or more operating parameters of a mass spectrometer may comprise altering an ion transmission efficiency of an ion transmission control device, optionally so as to reduce the effects of overlap or coalescence of ion arrivals in the one or more regions.

The method may further comprise digitising at least one individual signal or transient using an Analogue to Digital Converter.

The method may further comprise outputting the individual signal or transient from an ion detector.

The method may further comprise processing the marked or flagged digitised signals or transients, or data corresponding to marked or flagged digitised signals or transients, to reduce the effect of overlap or coalescence of ion arrivals in a or the composite mass spectral data set.

The step of processing may comprise discarding or downgrading data corresponding to marked or flagged digitised signals or transients in a or the composite mass spectral data set.

The method may further comprise de-convoluting marked or flagged digitised signals or transients and determining one or more first ion arrival times and one or more first ion arrival intensities associated with the marked or flagged digitised signals or transients.

The step of de-convoluting the digitised signal or transient may comprise either: (i) determining a point spread function characteristic of a single ion arriving at and being detected by an ion detector; or (ii) using a pre-determined point spread function characteristic of a single ion arriving at and being detected by an ion detector.

According to an aspect there is provided a mass spectrometer comprising:

a digitiser arranged and adapted to digitise at least one individual signal or transient; and a control system arranged and adapted:

(i) to determine in relation to the digitised signal or transient an indication of overlap and/or coalescence of ion arrivals in the digitised signal or transient, or one or more ion arrival envelopes in said digitised signal or transient; and (ii) to mark or flag the digitised signal or transient as suffering from overlap or coalescence of ion arrivals based on the indication.

According to an aspect there is provided a method of mass spectrometry comprising:

summing a plurality of digitised signals or transients to generate a composite mass spectral data set; and monitoring at least one of peak profile, mass to charge ratio and intensity within the composite mass spectral data set over time to determine an indication of overlap and/or coalescence of ion arrivals in the composite mass spectral data set.

Changes in said composite mass spectral data over time may represent a chromatographic elution profile. The plurality of digitised signals or transients may represent a chromatographic elution profile.

The step of monitoring may comprise evaluating the evolution of a peak in the composite mass spectral data set over time.

According to an aspect there is provided a mass spectrometer comprising a control system arranged and adapted:

(i) to sum a plurality of digitised signals or transients to generate a composite mass spectral data set; and (ii) to monitor at least one of peak profile, mass to charge ratio and intensity within the composite mass spectral data set over time to determine an indication of overlap and/or coalescence of ion arrivals in the composite mass spectral data set.

According to an aspect there is provided a method of mass spectrometry comprising:

digitising a plurality of individual signals or transients;

determining for each signal or transient a value or values relating to at least one of profile, shape, symmetry and peak purity, indicating the presence of multiple and/or unresolved signals which may lead to distortion of time or intensity information; and associating the value or values with each digitised signal or transient, or data relating to each digitised signal or transient, prior to subsequent processing or summation.

The method may further comprise summing the plurality of digitised signals or transients, or data relating to the digitised signals or transients, to generate a composite mass spectral data set; and determining in relation to the composite mass spectral data set an indication of the proportion and/or severity of instances that the individual signals or transients exhibited at least one of a profile, shape, symmetry or peak purity indicating the presence of multiple unresolved signals which may lead to distortion of time or intensity information.

In various embodiments a measure of peak purity or peak measurement corruption may be calculated for each detected signal on a push by push basis and this information may be stored with each time point in a summed spectra. This information may be subsequently used to identify corrupted data, guide post-processing operations, or to adjust the transmission or gain or sensitivity of a device such as to avoid corruption due to peak coalescence in a feedback mode of operation.

Various embodiments may comprise determining if overlap or coalescence of ion arrivals has occurred within each detected transient, resulting in a time and intensity pair with inaccurate time or intensity.

Various embodiments may comprise determining in relation to a composite mass spectral data set an indication of the proportion and/or severity of instances that the individual digitised signals or transients exhibited a profile, shape or symmetry indicting the presence of multiple unresolved signals which may lead to distortion of time, or intensity information.

Various embodiments may comprise determining if coalescence has occurred, and determining a measure of peak purity or likelihood of corruption in the measurement of time and or intensity for each detected signal on a push by push basis.

In the context of mass spectrometry, peak purity gives a measure of the likelihood that a measured signal is comprised of signal from a single mass spectral species or from multiple unresolved or overlapping species.

Methods of the disclosure may recognise, flag and control peak coalescence and/or corruption in peak detecting Analogue to Digital Converter systems.

According to an embodiment the mass spectrometer may further comprise:

(a) an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; and (xxviii) a Laser Ablation Electrospray Ionisation ("LAESI") ion source; and/or (b) one or more continuous or pulsed ion sources; and/or (c) one or more ion guides; and/or (d) one or more ion mobility separation devices and/or one or more Field Asymmetric Ion Mobility Spectrometer devices; and/or (e) one or more ion traps or one or more ion trapping regions; and/or (f) one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device; and/or (g) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (h) one or more energy analysers or electrostatic energy analysers; and/or (i) one or more ion detectors; and/or (j) one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter; and/or (k) a device or ion gate for pulsing ions; and/or (l) a device for converting a substantially continuous ion beam into a pulsed ion beam.

The mass spectrometer may further comprise either:

(i) a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser; and/or (ii) a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

According to an embodiment the mass spectrometer further comprises a device arranged and adapted to supply an AC or RF voltage to the electrodes. The AC or RF voltage optionally has an amplitude selected from the group consisting of: (i) about <50 V peak to peak; (ii) about 50-100 V peak to peak; (iii) about 100-150 V peak to peak; (iv) about 150-200 V peak to peak; (v) about 200-250 V peak to peak; (vi) about 250-300 V peak to peak; (vii) about 300-350 V peak to peak; (viii) about 350-400 V peak to peak; (ix) about 400-450 V peak to peak; (x) about 450-500 V peak to peak; and (xi) >about 500 V peak to peak.

The AC or RF voltage may have a frequency selected from the group consisting of: (i) <about 100 kHz; (ii) about 100-200 kHz; (iii) about 200-300 kHz; (iv) about 300-400 kHz; (v) about 400-500 kHz; (vi) about 0.5-1.0 MHz; (vii) about 1.0-1.5 MHz; (viii) about 1.5-2.0 MHz; (ix) about 2.0-2.5 MHz; (x) about 2.5-3.0 MHz; (xi) about 3.0-3.5 MHz; (xii) about 3.5-4.0 MHz; (xiii) about 4.0-4.5 MHz; (xiv) about 4.5-5.0 MHz; (xv) about 5.0-5.5 MHz; (xvi) about 5.5-6.0 MHz; (xvii) about 6.0-6.5 MHz; (xviii) about 6.5-7.0 MHz; (xix) about 7.0-7.5 MHz; (xx) about 7.5-8.0 MHz; (xxi) about 8.0-8.5 MHz; (xxii) about 8.5-9.0 MHz; (xxiii) about 9.0-9.5 MHz; (xxiv) about 9.5-10.0 MHz; and (xxv) >about 10.0 MHz.

The mass spectrometer may also comprise a chromatography or other separation device upstream of an ion source. According to an embodiment the chromatography separation device comprises a liquid chromatography or gas chromatography device. According to another embodiment the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The ion guide may be maintained at a pressure selected from the group consisting of: (i) <about 0.0001 mbar; (ii) about 0.0001-0.001 mbar; (iii) about 0.001-0.01 mbar; (iv) about 0.01-0.1 mbar; (v) about 0.1-1 mbar; (vi) about 1-10 mbar; (vii) about 10-100 mbar; (viii) about 100-1000 mbar; and (ix) >about 1000 mbar.

According to an embodiment analyte ions may be subjected to Electron Transfer Dissociation ("ETD") fragmentation in an Electron Transfer Dissociation fragmentation device. Analyte ions may be caused to interact with ETD reagent ions within an ion guide or fragmentation device.

According to an embodiment in order to effect Electron Transfer Dissociation either: (a) analyte ions are fragmented or are induced to dissociate and form product or fragment ions upon interacting with reagent ions; and/or (b) electrons are transferred from one or more reagent anions or negatively charged ions to one or more multiply charged analyte cations or positively charged ions whereupon at least some of the multiply charged analyte cations or positively charged ions are induced to dissociate and form product or fragment ions; and/or (c) analyte ions are fragmented or are induced to dissociate and form product or fragment ions upon interacting with neutral reagent gas molecules or atoms or a non-ionic reagent gas; and/or (d) electrons are transferred from one or more neutral, non-ionic or uncharged basic gases or vapours to one or more multiply charged analyte cations or positively charged ions whereupon at least some of the multiply charged analyte cations or positively charged ions are induced to dissociate and form product or fragment ions; and/or (e) electrons are transferred from one or more neutral, non-ionic or uncharged superbase reagent gases or vapours to one or more multiply charged analyte cations or positively charged ions whereupon at least some of the multiply charge analyte cations or positively charged ions are induced to dissociate and form product or fragment ions; and/or (f) electrons are transferred from one or more neutral, non-ionic or uncharged alkali metal gases or vapours to one or more multiply charged analyte cations or positively charged ions whereupon at least some of the multiply charged analyte cations or positively charged ions are induced to dissociate and form product or fragment ions; and/or (g) electrons are transferred from one or more neutral, non-ionic or uncharged gases, vapours or atoms to one or more multiply charged analyte cations or positively charged ions whereupon at least some of the multiply charged analyte cations or positively charged ions are induced to dissociate and form product or fragment ions, wherein the one or more neutral, non-ionic or uncharged gases, vapours or atoms are selected from the group consisting of: (i) sodium vapour or atoms; (ii) lithium vapour or atoms; (iii) potassium vapour or atoms; (iv) rubidium vapour or atoms; (v) caesium vapour or atoms; (vi) francium vapour or atoms; (vii) $C_{60}$ vapour or atoms; and (viii) magnesium vapour or atoms.

The multiply charged analyte cations or positively charged ions may comprise peptides, polypeptides, proteins or biomolecules.

According to an embodiment in order to effect Electron Transfer Dissociation: (a) the reagent anions or negatively charged ions are derived from a polyaromatic hydrocarbon or a substituted polyaromatic hydrocarbon; and/or (b) the reagent anions or negatively charged ions are derived from the group consisting of: (i) anthracene; (ii) 9,10 diphenyl-anthracene; (iii) naphthalene; (iv) fluorine; (v) phenanthrene; (vi) pyrene; (vii) fluoranthene; (viii) chrysene; (ix) triphenylene; (x) perylene; (xi) acridine; (xii) 2,2' dipyridyl; (xiii) 2,2' biquinoline; (xiv) 9-anthracenecarbonitrile; (xv) dibenzothiophene; (xvi) 1,10'-phenanthroline; (xvii) 9' anthracenecarbonitrile; and (xviii) anthraquinone; and/or (c) the reagent ions or negatively charged ions comprise azobenzene anions or azobenzene radical anions.

According to an embodiment the process of Electron Transfer Dissociation fragmentation comprises interacting analyte ions with reagent ions, wherein the reagent ions comprise dicyanobenzene, 4-nitrotoluene or azulene.

BRIEF DESCRIPTION OF THE DRAWINGS

Various embodiments will now be described, by way of example only, together with examples for illustrative purposes, and with reference to the accompanying drawings in which.

DETAILED DESCRIPTION

Two examples of how ion arrivals are resolved into time and intensity pairs will now be described in relation to FIGS. 1A and 1B.

Figure 1A:
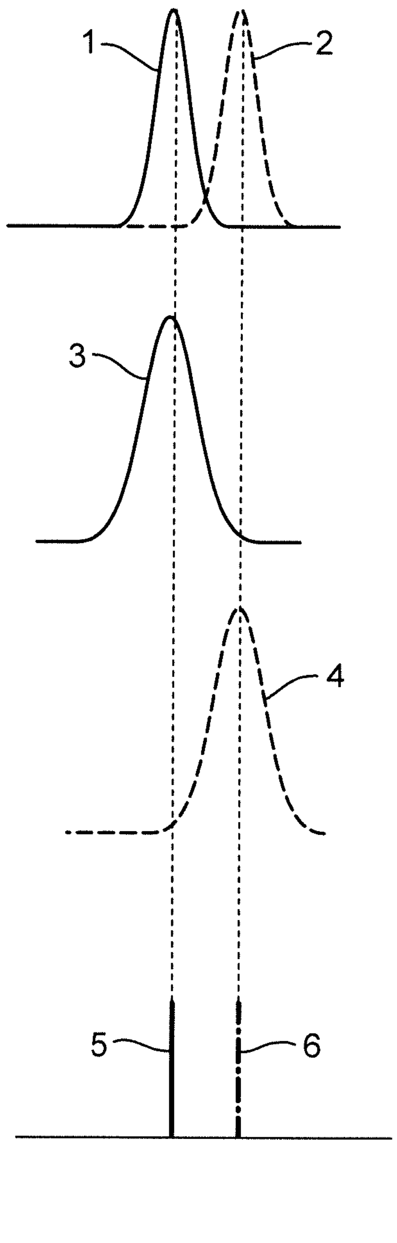
FIG. 1A shows an example of two ion arrival envelopes that can be resolved separately and FIG. 1B shows an example of two ion arrival envelopes that overlap or coalesce.

FIG. 1A shows two ion arrival envelopes 1 and 2 that can be resolved separately. The ion arrival envelope may represent the probability of an ion arriving at a particular time of flight from a Time of Flight mass spectrometer or analyser. The ion arrival envelope may include contributions from focussing and/or energy spreads in the Time of Flight mass spectrometer, and/or jitter in trigger and/or acquisition electronics and/or an ion detector. The ion arrival envelope may represent the underlying limit of mass resolution for the Time of Flight mass spectrometer without, for example, contribution from the analogue signal profile generated during an electron multiplication process.

In the example of FIG. 1A, both the ion arrival envelope and the profile for a single ion arrival are optionally symmetrical and Gaussian. The width of a single ion at full-width-half-maximum ("FWHM") has been chosen to be twice the width of the ion arrival envelope at full-width-half-maximum. The situation where the ion arrival envelope is narrower than the single ion profile is common in Time of Flight mass spectrometry, especially at low mass to charge ratio values. This may be due in large part to the speed of electron multipliers, bandwidth amplification systems, and ADC input electronics which may limit the practical width of the single ion response profile.

In FIG. 1A the intensity of the incoming ion beam for both mass spectral species may be such that in any individual time of flight spectrum ions arrive singly.

A first time of flight spectrum signal 3 optionally arises from the arrival of an ion within a first ion arrival envelope 1 from a first mass spectral species. The first time of flight spectrum signal 3 may be reduced to a first time and intensity pair 5, which optionally represents an accurate arrival time and intensity for the first ion arrival envelope 1. The first time and intensity pair 5 may subsequently be added to a composite mass spectrum.

A second time of flight spectrum signal 4 optionally arises from the arrival of an ion within a second ion arrival envelope 2 from a second mass spectral species. The second time of flight spectrum signal 4 may be reduced to a second time and intensity pair 6, which optionally represents an accurate arrival time and intensity for the second ion arrival envelope 2. The second time and intensity pair 6 may subsequently be added to a composite mass spectral data set.

After many such ion arrivals and processing steps the composite mass spectral data set may contain data reflecting substantially the ion arrival envelope peak shapes 1 and 2 and the two species shown appear resolved from each other. As a result, after calibration their mass measurement and area may be un-distorted.

Figure 1B:
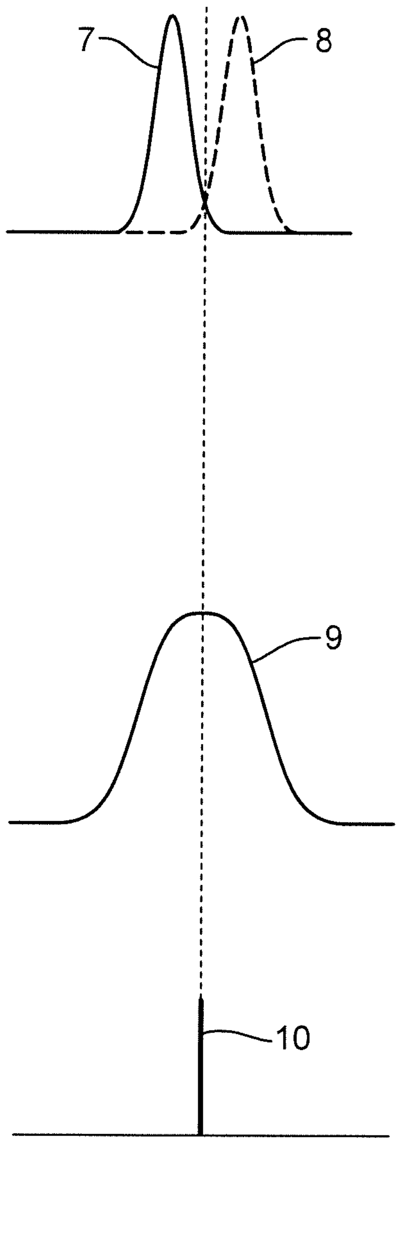

FIG. 1B shows two ion arrival envelopes 7 and 8 that overlap or coalesce. The flux or intensity of the incoming ion beam has, for example, increased such that more than one ion arrives in a single time of flight spectra.

A time of flight spectrum signal 9 shown in FIG. 1B is the result of ion arrival signals 7 and 8 arriving in a single time of flight spectrum. The profile for a single ion may have a width at full-width-half-maximum which is twice that of the ion arrival envelope width at full-width-half-maximum, and in this example the two signals 7 and 8 are not resolved from each other.

The time of flight spectrum signal 9 may subsequently be processed and, in this example, results in a single time and intensity pair 10, which may then be added to a composite mass spectral data set. Depending on the method of processing the intensity may be recorded correctly for the combined signal (if area is calculated) or incorrectly (if the peak maxima is recorded). The time is always recorded incorrectly.

As the flux of incoming ions increases the number of times two ions from these two mass spectral species arrive may simultaneously increase. At low ion flux simultaneous ion arrivals may be so infrequent that no significant distortion occurs in the composite spectra. The two species may be resolved in the composite spectra.

At moderate ion flux a proportion of the time of flight spectra processed may contain multiple ion arrivals leading to some distortion. This may result in a shifting of the centroids in the summed spectra and the possible appearance of an artefact peak between the two peaks described by the ion arrival envelopes.

At high ion flux, most of the time of flight spectra may contain simultaneous ion arrivals from both species. A single peak at an incorrect position may appear in the summed spectrum and the two individual mass spectral peaks may have coalesced.

This situation may occur when the width of the signal from a single ion arrival approaches or exceeds the width of the ion arrival envelope. If the width of a single ion arrival is significantly smaller than the width of the ion arrival envelope resolution may be predominantly limited by the width of the ion arrival envelope itself.

It may not be possible to determine if corruption, distortion, appearance of artefacts or coalescence has occurred by examining a composite mass spectral data set. This is because the information relating to the profile or shape of the individual ion arrivals which make up the composite mass spectrum may be lost when signals are reduced to time intensity pairs.

Various embodiments will now be described in more detail.

In accordance with an embodiment, to reliably identify and flag possible corruption in mass spectral data the individual signals or transients (e.g. that are digitised and optionally output from an ion detector) are optionally assessed or interrogated for corruption of ion arrival data during or before the process of being reduced to time and intensity pairs.

The single ion pulse profile or ion arrival signal may be known and the expected ion arrival envelope profile (instrument resolution) may also be known for given time of flight data, and the peak purity of the signal detected may be assessed during processing optionally to determine if distortion has occurred.

The ion arrival envelope may be determined by measuring the profile of the peaks in the composite spectrum at different mass to charge ratio values, optionally under single ion arrival conditions. The single ion pulse profile or ion arrival signal may be directly measured, optionally by recording single time of flight spectra.

Data and/or information relating to peak purity may be calculated in addition to time and intensity data and/or information. Some examples are given below.

Peak area to the left hand side of the centroid or maxima, and peak area to the right hand side of the maxima may be determined. These values or a ratio of these values may give an indication of the symmetry of the signal and may be compared with an expected symmetry.

Intensity quantiles may be calculated. For example, quartiles and inter-quartile ranges may be calculated. For example, T0 may be the time determined as the start of the peak and TE may be the time determined as the end of the peak. The total area may be determined i.e. the area between T0 and TE. A time T1 may be calculated, which may represent the area of the digitised signal between times T0 and T1 which is about 25% of the total area, i.e. a quartile. Similar times encompassing other quartiles, such as about 50% and about 75% of the peak area, may be determined.

The inter-quartile range values may be examined, and may be compared to expected, known or calibrated values for a single species and may give a measure of peak symmetry and shape and hence allow a determination of corruption to be made.

For example, the ratio R may be examined, where:

$$R = \frac{T3 - T2}{T2 - T1} \quad (1)$$

wherein T1 represents the area of the digitised signal between times T0 and T1 that is about 25% of the total area, T2 represents the area of the digitised signal between times T0 and T1 that is about 50% of the total area, and T3 represents the area of the digitised signal between times T0 and T1 that is about 75% of the total area.

Other values such as standard deviation, centre of mass, skew, and kurtosis may be measured.

Additionally, the width of the detected signal at the base, half height or other percentage height, or values at multiple percentage heights, or ratios of these values may be indicative of peak shape and hence may be used to assess peak purity.

The peak width of the left hand side of the determined arrival time with respect to the peak width of the right hand side at different percentage values may be calculated.

Other measurements related to the profile of the single ion pulse profile or ion arrival signal may include the intensity determined at the start and the end of the detected signal, and the gradient at the start and end of the signal, which may be calculated from differentiation and/or intensity differences.

Many other properties, differences between properties or ratios of properties or combinations of these properties may be measured to assess the likelihood of corruption leading to distortion, artefacts and or coalescence in the composite mass spectral data set.

There are many ways to use some or all of the information above to determine if the detected peak arises from ions of a single mass to charge value or from multiple unresolved signals.

Referring to the peak 9 shown in FIG. 1B, this peak is made up of two ions arriving simultaneously from the two ion arrival envelopes. It is clear, in this example, that the width of the peak is larger than for a single ion arrival indicating that more than one unresolved ion arrivals may have been detected. In addition, the width of the signal as a ratio of the ion area or maxima may also indicate that this signal does not arise from a single ion arrival. Other metrics such as the area as a ratio of the maxima may also give an indication of the shape of this signal before it is reduced to a time and intensity pair.

It will be appreciated that the example of FIG. 1B is a fairly simple example. In reality, for a single resolved species under multiple ion arrival conditions the maximum width expected may relate to the ion arrival envelope convolved with a single ion profile. To avoid interpreting the presence of peak measurement corruption incorrectly a threshold value of a given peak purity value or metric, such as those discussed above and herein, may be calculated. A value or metric that is sufficiently different from this threshold, such as exceeds this threshold, may cause a signal to be flagged. The threshold value may be determined experimentally. The threshold value may be relaxed such that the process may be adjusted to reflect different severity of corruption.

In addition several threshold values may be set indicating the severity of the distortion. In this case the determination of more severe distortion may arrange to contribute more to the appearance of flags in the composite spectrum.

In some cases two maxima or centroids may be determined from partially overlapping signals. However, the intensity and the time calculated may still be incorrect unless more sophisticated de-convolution algorithms are employed as a post-processing technique. The presence of corruption may be determined by the difference in calculated arrival time compared to the width of the expected signal.

Figure 2:
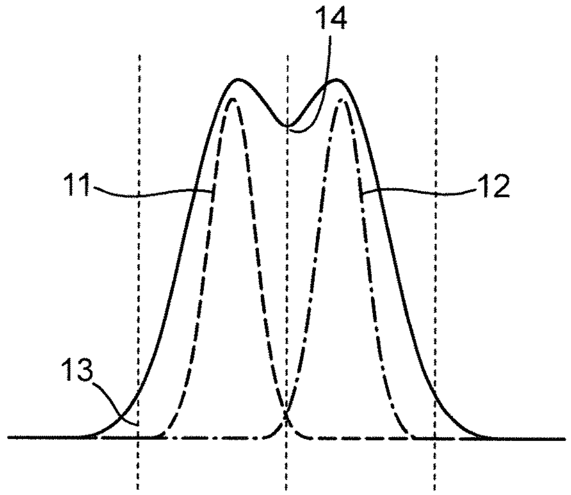
FIG. 2 shows an example of two further ion arrival envelopes that overlap or coalesce.

FIG. 2 shows an example of two ion arrival envelopes 11,12 that are further apart in time than shown in the example of FIG. 1B. When two ions arrive simultaneously there may be a valley in the resultant ion arrival signal, as shown in FIG. 2. A peak detection algorithm may then determine two maxima or centroid values. The calculated peak widths at base may be close to that expected for a single isolated species. However, the arrival time and intensity values determined for the signals may be incorrect.

The dotted lines in FIG. 2 indicate the start and end points determined for the peaks, see e.g. the start point 13 and end point 14 corresponding to the first ion arrival 11.

There are several ways to determine that this may be corrupt data from the shape information available, even though the width at the base may appear to be similar to the width of the ion arrival envelope.

For example, it may be determined that the ratio of the intensity of the start and end of the peaks deviates from a value close to 1, which may be expected for a symmetrical peak.

It could also be determined that the ratio of the width at base to the width at half height is closer to 1 than expected. Both skew and kurtosis may be determined and may vary from expected values. The delta time between the peaks may be determined and may be less than a defined number of peak widths apart, optionally based on an expected, known or calibrated ion arrival envelope and/or single ion profile.

The gradient of the peak at the start or end may be determined and both gradients may not be as expected for an isolated peak. The ratio of the area on either side of the centroids may be determined and may not be as expected for a pure peak.

Further measurements may be used to flag this signal as corrupt.

Alternatively, or in addition, more than one of the peak purity measurements discussed above and herein may be measured and/or compared, for example to determine if the signal is corrupt, and/or to determine an indication of overlap and/or coalescence of ion arrivals in the signal.

Referring to the examples shown in FIGS. 1B and 2, either or both the width of the peak from the start to the end of an Analogue to Digital Converter sample may be determined as being outside predetermined values. The difference in or ratio of intensity of an Analogue to Digital Converter sample at the start of the peak compared to an Analogue to Digital Converter sample at the end of the peak may be determined as being outside predetermined values. If the determination does result in values outside those predetermined, the peak may be flagged as corrupt.

Other measurements may be added to refine this determination. For example in the case of FIG. 2, the difference in time between the two centroids may be determined, such that it may be known, from knowledge of the ion arrival profile, that these may represent two overlapping signals.

In various embodiments each detected signal may be interrogated to determine if a corrupted measurement of intensity and or time has been made. If the signal is determined to be corrupt this time and intensity pair may be associated with a flag.

The proportion of times this flag has been detected may be recorded, optionally relative to the total number of ion detections at each time location within the composite mass spectral data set.

The final spectrum written to disk may contain flags within the data indicating the likelihood or severity of distortion as described.

Figure 3:
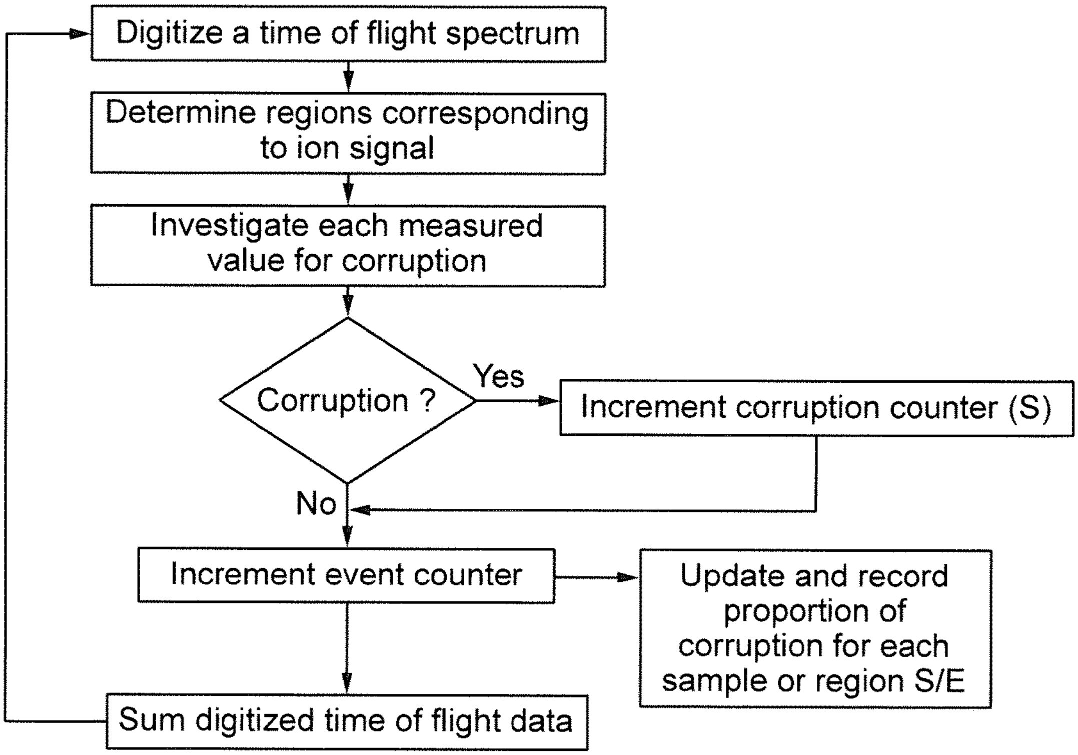
FIG. 3 shows a generalised flow diagram illustrating steps according to an embodiment.

FIG. 3 shows a generalized flow diagram illustrating steps according to an embodiment.

As shown in FIG. 3, a single spectrum or transient, which may comprise a single time of flight spectrum or transient, is optionally digitised. Regions corresponding to one or more ion peaks in the single time of flight spectrum or transient may then be determined.

According to various embodiments an investigation or determination may then be made to see whether or not any of the regions corresponding to an ion peak suffer from overlap and/or coalescence of ion arrivals. If a particular region is determined as corrupted in this manner then a corruption counter S for that particular region is optionally incremented.

An event counter E may also be incremented for each digitised spectrum or transient.

The ratio of corruption events S to total events E is then optionally updated for each region. The digitised time of flight data may then be summed with other acquired time of flight data.

Flags may be used to visually display to a user the presence of corruption and/or used to guide intensity feedback control logic for a target ion, for example to keep an ion flux below a level where corruption and/or coalescence might occur, or as part of a transmission switching experiment to increase overall dynamic range without corruption.

Software may automatically ignore peaks or data containing a flag when summing spectra, for example within the volume of a chromatographic and/or ion mobility peak.

Without determination of corruption on the individual transients and recording this with the composite spectrum, it may not be possible to determine, within an individual spectrum, if a peak contains corrupt data. Therefore, it may not be possible to determine if a signal should be attenuated to control this distortion.

Two or more values indicating the proportion of corrupt time and intensity pairs may be associated with the composite spectrum. For example, about 10% corruption and about 50% corruption flags. These may then be used to refine a feedback intensity control algorithm, optionally acting as thresholds to trigger attenuation of the signal.

In various embodiments, a data set may contain several consecutive composite spectra, in which the intensity of the incoming ion beam optionally increases and/or decreases. In this situation, the measured mass to charge ratio value, peak profiles and/or intensities in the composite spectra may be monitored, optionally to determine if intensity related coalescence and/or corruption has occurred.

For example, peaks within a composite spectrum may be monitored during a chromatographic elution profile. At the start of a chromatographic peak, a doublet may be seen as shown in FIG. 1. As the intensity of the incoming ion beam increases, the mass to charge ratio measurement and/or peak shape may change in an unexpected way due to effects such as detector saturation. In severe cases, for example at high intensity, the doublet may coalesce into a single peak. As the intensity decreases on the tailing edge of the chromatographic peak the doublet may reappear.

In this case the occurrence of coalescence or intensity related corruption may be determined from the evolution of peaks in the series of consecutive composite spectra, which may or may not be determined employing methods described above. This effect may be used control intensity in a feedback transmission control mechanism or to flag data during subsequent post-processing. This method may also be used in conjunction with the methods described.

In all of the embodiments described herein, a de-convolution algorithm may be applied to each single ion pulse profile or ion arrival signal after it has been flagged or marked as suffering from overlap and/or coalescence of ion arrivals. An Analogue to Digital Converter may be used to digitise a signal from an ion detector as described above. The de-convolution may comprise determining a point spread function characteristic of a single ion arriving at and being detected by the ion detector, or using a pre-determined point spread function characteristic of a single ion arriving at and being detected by said ion detector.

More sophisticated measurements of peak shape may be used such as curve fitting, which may produce coefficients of curves that can then be compared to model data to optionally determine if the data should be flagged as corrupt. In addition, crude peak de-convolution algorithms, distinguished from the complex de-convolution algorithm discussed above, may also be used to generate information about peak shape and symmetry and the presence of corruption in time and/or area measurements.

Particular transients for treatment using more sophisticated peak processing algorithms may be selected using the marks or flags. For example, if a transient signal is determined to be comprised of signals arising from several, simultaneous ion arrivals this particular transient may be directed towards a de-convolution routine as discussed above, and/or a peak detection routine. As only a subset of the detected transients may be processed using these more sophisticated algorithms, the overall processing power required is significantly reduced.

The methods of assessing peak purity described above may be used to assess peak purity in a final composite data set. This may allow mass measurements from processing of the composite spectrum to be qualified or flagged as corrupt.

Although described for peak detecting Analogue to Digital Converters the methods described herein may also be employed with signal averagers or Time to Digital Converters. In this case the digitized signal may be summed directly into a composite mass spectral data set. In this case the presence of corruption may be determined on the individual transients or from the final composite spectrum by the methods described.

Methods described herein are also applicable to systems where, rather than the maxima being recorded, the top n points from a detected transient may be averaged or summed into the composite spectrum.

Although the present disclosure has been described with reference to various embodiments, it will be understood by those skilled in the art that various changes in form and detail may be made without departing from the scope of the disclosure as set forth in the accompanying claims.

The invention claimed is:

1. A method of mass spectrometry comprising:

digitising at least one individual signal or transient;

determining in relation to said digitised signal or transient an indication of overlap and/or coalescence of ion arrivals in said digitised signal or transient, or one or more ion arrival envelopes in said digitised signal or transient; and marking or flagging said digitised signal or transient as suffering from overlap or coalescence of ion arrivals based on said indication.

2. A method as claimed in claim 1, wherein said indication of overlap and/or coalescence of ion arrivals comprises one or more geometrical features of the ion arrival envelope in said digitised signal or transient.

3. A method as claimed in claim 2, wherein said one or more geometrical features comprises at least one of profile, shape, symmetry, peak purity, peak area, intensity quantiles, standard deviation, centre of mass, peak width, skew and kurtosis.

4. A method as claimed in claim 3, wherein said determining an indication of a proportion and/or severity of instances that the digitised signals or transients suffered from overlap and/or coalescence of ion arrivals comprises comparing at least one of said geometrical features with an expected, known or calibrated value.

5. A method as claimed in claim 1, further comprising processing said at least one digitised signal or transient to identify one or more peak profiles or ion arrival envelopes that are corrupted due to overlap or coalescence of ion arrivals.

6. A method as claimed in claim 5, further comprising determining intensity and arrival time, mass or mass to charge ratio data for each of said one or more peak profiles or ion arrival envelopes that are corrupted due to overlap or coalescence of ion arrivals, such that each of said one or more peak profiles or ion arrival envelopes are reduced to one or more time and intensity pairs.

7. A method as claimed in claim 6, wherein said step of marking or flagging said digitised signal or transient comprises marking or flagging said time and intensity pair(s) as suffering from overlap or coalescence of ion arrivals.

8. A method as claimed in any of claim 5, further comprising de-convoluting each of said one or more corrupted peak profiles or ion arrival envelopes and determining two or more ion arrival times and two or more first ion arrival intensities associated with each of said one or more corrupted peak profiles or ion arrival envelopes.

9. A method as claimed in claim 8, wherein said step of de-convoluting said digitised signal or transient comprises either: (i) determining a point spread function characteristic of a single ion arriving at and being detected by an ion detector; or (ii) using a pre-determined point spread function characteristic of a single ion arriving at and being detected by an ion detector.

10. A method as claimed in claim 1, further comprising summing a plurality of said digitised signals or transients or data relating to said digitised signals or transients to generate a composite mass spectral data set.

11. A method as claimed in claim 10, further comprising determining in relation to said composite mass spectral data set an indication of the proportion and/or severity of instances that the digitised signals or transients suffered from overlap and/or coalescence of ion arrivals.

12. A method as claimed in claim 10, wherein said determining an indication of the proportion and/or severity of instances that the digitised signals or transients suffered from overlap and/or coalescence of ion arrivals comprises counting the number of digitised signals or transients, peak profiles or ion arrival envelopes that have been marked or flagged as suffering from overlap or coalescence of ion arrivals.

13. A method as claimed in claim 10, wherein said determining an indication of the proportion and/or severity of instances that the digitised signals or transients suffered from overlap and/or coalescence of ion arrivals comprises determining a ratio A:B indicative of the proportion and/or severity of instances that the digitised signals or transients, peak profiles or ion arrival envelopes suffered from overlap and/or coalescence of ion arrivals.

14. A method as claimed in claim 13, wherein A is representative of the number of digitised signals or transients, peak profiles or ion arrival envelopes that have been marked or flagged as suffering from overlap or coalescence of ion arrivals within a given arrival time or ion mobility region, and B is representative of a total number of digitised signals or transients that were summed within said given arrival time or ion mobility region.

15. A method as claimed in claim 10, further comprising altering one or more operating parameters of a mass spectrometer in response to determining one or more regions of said composite mass spectral data set that suffer from overlap or coalescence of ion arrivals.

16. A method as claimed in claim 15, wherein said step of altering one or more operating parameters of a mass spectrometer comprises altering an ion transmission efficiency of an ion transmission control device so as to reduce the effects of overlap or coalescence of ion arrivals in said one or more regions.

17. A method as claimed in claim 1, further comprising outputting said individual signal or transient from an ion detector, and digitising said at least one individual signal or transient using an Analogue to Digital Converter.

18. A method as claimed in claim 1, further comprising processing said marked or flagged digitised signals or transients, or data corresponding to marked or flagged digitised signals or transients, to reduce the effect of overlap or coalescence of ion arrivals in a or the composite mass spectral data set.

19. A method as claimed in claim 18, wherein said processing comprises discarding or downgrading data corresponding to marked or flagged digitised signals or transients in a or the composite mass spectral data set.

20. A mass spectrometer comprising:

a digitiser arranged and adapted to digitise at least one individual signal or transient; and a control system arranged and adapted:

(i) to determine in relation to said digitised signal or transient an indication of overlap and/or coalescence of ion arrivals in said digitised signal or transient, or one or more ion arrival envelopes in said digitised signal or transient; and (ii) to mark or flag said digitised signal or transient as suffering from overlap or coalescence of ion arrivals based on said indication.

21. A method of mass spectrometry comprising:

summing a plurality of digitised signals or transients to generate a composite mass spectral data set; and monitoring at least one of peak profile, mass to charge ratio and intensity within the composite mass spectral data set over time to determine an indication of overlap and/or coalescence of ion arrivals in said composite mass spectral data set.

22. A mass spectrometer comprising a control system arranged and adapted:

(i) to sum a plurality of digitised signals or transients to generate a composite mass spectral data set; and (ii) to monitor at least one of peak profile, mass to charge ratio and intensity within the composite mass spectral data set over time to determine an indication of overlap and/or coalescence of ion arrivals in said composite mass spectral data set.

* * * * *